(12) United States Patent
Kim et al.

(10) Patent No.: US 12,141,953 B2
(45) Date of Patent: Nov. 12, 2024

(54) TAPE INSPECTION DEVICE AND SECONDARY BATTERY MANUFACTURING SYSTEM HAVING THE SAME

(71) Applicant: SK INNOVATION CO., LTD., Seoul (KR)

(72) Inventors: Sang Min Kim, Daejeon (KR); Dong Whan Shin, Daejeon (KR)

(73) Assignee: SK ON CO., LTD., Seoul (KR)

( * ) Notice: Subject to any disclaimer, the term of this patent is extended or adjusted under 35 U.S.C. 154(b) by 363 days.

(21) Appl. No.: 17/535,948

(22) Filed: Nov. 26, 2021

(65) Prior Publication Data

US 2022/0172345 A1 Jun. 2, 2022

(30) Foreign Application Priority Data

Nov. 27, 2020 (KR) .................. 10-2020-0162496

(51) Int. Cl.
*G06T 7/00* (2017.01)
*H01M 10/04* (2006.01)

(52) U.S. Cl.
CPC ....... *G06T 7/0004* (2013.01); *H01M 10/0404* (2013.01); *G06T 2207/30164* (2013.01)

(58) Field of Classification Search
CPC .......... G06T 7/00; G06T 2207/30164; H01M 10/0404; H01M 50/166; H01M 50/105; H01M 10/4285; B29C 66/4332; G01N 21/8806; G01N 21/95
USPC .................................................. 382/100, 141
See application file for complete search history.

(56) References Cited

U.S. PATENT DOCUMENTS

2019/0178808 A1* 6/2019 Muhr ................. G01N 21/9503
2020/0282668 A1* 9/2020 Holmes ................. G06T 7/0006

FOREIGN PATENT DOCUMENTS

KR 101752529 B1 * 6/2017
KR 102261757 B1 * 6/2021

* cited by examiner

*Primary Examiner* — Sheela C Chawan
(74) *Attorney, Agent, or Firm* — IP & T GROUP LLP

(57) ABSTRACT

Provided is a tape inspection device. The tape inspection device according to the present invention includes: a vision unit for acquiring imaging information by imaging a tape attached to an outer wall of a secondary battery in order to fix a folding portion of the secondary battery; a light reflection unit disposed to be spaced apart from the secondary battery and reflecting light; and an optical path compensation unit disposed between the vision unit and the light reflection unit and compensating for an optical path between the tape and the vision unit.

16 Claims, 6 Drawing Sheets

US 12,141,953 B2

TAPE INSPECTION DEVICE AND SECONDARY BATTERY MANUFACTURING SYSTEM HAVING THE SAME

CROSS-REFERENCE TO RELATED APPLICATIONS

This application claims priority under 35 U.S.C. § 119 to Korean Patent Application No. 10-2020-0162496, filed on Nov. 27, 2020, in the Korean Intellectual Property Office, the disclosure of which is incorporated herein by reference in its entirety.

TECHNICAL FIELD

The following disclosure relates to a tape inspection device and a secondary battery manufacturing system having the same, and more particularly, to a tape inspection device capable of accurately determining the degree of attachment of a tape attached to fix a folding portion of a pouch-type secondary battery, and a secondary battery manufacturing system having the same.

BACKGROUND

In general, a secondary battery refers to a battery that converts chemical energy into electrical energy to supply power to an external circuit, or receives external power when discharged, and converts electrical energy into chemical energy to store electricity. Such a secondary battery is also commonly referred to as a capacitor.

Such a secondary battery may be variously classified according to a shape thereof. For example, the secondary battery may be classified into a square-type structure, a cylindrical structure, a pouch-type structure, and the like.

The secondary battery with a cylindrical structure is covered with a can, which is made of a material of iron plated with nickel.

The secondary battery with a pouch-type structure uses a pouch as an exterior material for enclosing an electrode laminate, and has advantages in that the unit weight and energy density per volume may be higher, and the thickness and weight may be reduced.

FIG. 1 is a view illustrating a typical pouch-type secondary battery. Referring to FIG. 1, the pouch-type secondary battery includes an electrode assembly (11) having a structure in which a positive electrode plate and a negative electrode plate filled with an electrode active material and a separator interposed between the positive electrode plate and the negative electrode plate are stacked.

A positive electrode tab (12*a*) is formed on one side of the positive electrode plate, and a negative electrode tab (13*a*) is formed on one side of the negative electrode plate. The tabs (12*a*, 13*a*) are connected to an external circuit by being connected to leads (14, 15) respectively. Such an electrode assembly (11) is sealed by a pouch (16) which is the exterior material.

The pouch (16) includes a cover (16*a*, 16*b*), and a side folding portion (P) is formed on a long-width side surface of the pouch (16), in which edges of the cover 16*a* and the case 16*b* are folded.

In order to fix the side folding portion P described above, an automatic tape attaching machine attaches a tape made of a polyimide (PI) material to an upper surface, a side surface, and a lower surface of the pouch (16).

However, since defects such as bubbles and float may occur in the tape attached by such an automatic tape attaching machine, it is necessary to inspect an attachment state of the tape.

Conventionally, a camera was used to inspect the attachment state of the tape. In this case, since there are several portions to be inspected (the upper surface, the side surface, and the lower surface of the secondary battery), there is a problem that the inspection is inaccurate due to interference caused by a plurality of light sources illuminating the several portions when a plurality of cameras are used. When using a single camera to avoid such a problem, there is a problem in that the inspection is inaccurate because an optical path to each portion to be inspected (the upper surface, the side surface, and the lower surface of the secondary battery) is different and a focus is not correct.

RELATED ART DOCUMENT

Patent Document (Patent Document 1) Korea Patent Laid-open Publication No. 10-2003-0086069 (2003 Nov. 7.)

SUMMARY

An embodiment of the present invention is to provide a tape inspection device capable of acquiring a clear imaging screen of a tape by compensating for an optical path, and a secondary battery manufacturing system having the same.

In one general aspect, a tape inspection device includes: a vision unit for acquiring imaging information by imaging a tape attached to an outer wall of a secondary battery in order to fix a folding portion of the secondary battery; a light reflection unit disposed to be spaced apart from the secondary battery and reflecting light; and an optical path compensation unit disposed between the vision unit and the light reflection unit and compensating for an optical path between the tape and the vision unit.

The tape may include an upper surface tape portion attached to an upper wall of the secondary battery; a lower surface tape portion attached to a lower wall of the secondary battery; and a side surface tape portion connected to the upper surface tape portion and the lower surface tape portion and attached to a sidewall disposed between an upper wall of the secondary battery and a lower wall of the secondary battery.

The vision unit includes a single camera imaging all of the upper surface tape portion, the lower surface tape portion, and the side surface tape portion at the same time.

The light reflection unit may include an upper light reflecting portion disposed in an upper region of the secondary battery; and a lower light reflecting portion disposed in a lower region of the secondary battery.

The optical path compensation unit may include an optical path compensating lens portion for changing a focal length according to a thickness through which light passes.

The optical path compensation unit may include a first compensating portion disposed between the upper light reflecting portion and the vision unit; and a second compensating portion disposed between the lower light reflecting portion and the vision unit.

The tape inspection device may further include a first light source unit disposed between the optical path compensation unit and the vision unit and emitting light toward the tape.

The tape inspection device may further include a second light source unit disposed to be spaced apart from the vision unit with the first light source unit interposed therebetween and emitting light from an opposite side of the first light source unit to the tape.

In another general aspect, a secondary battery manufacturing system includes: a tape attachment device for attaching a tape an outer wall of a secondary battery in order to fix a folding portion formed in the secondary battery; a vision unit for acquiring imaging information by imaging the tape attached to the outer wall of the secondary battery; a light reflection unit disposed to be spaced apart from the secondary battery and reflecting light; and an optical path compensation unit disposed between the vision unit and the light reflection unit and compensating for an optical path between the tape and the vision unit.

The tape may include an upper surface tape portion attached to an upper wall of the secondary battery; a lower surface tape portion attached to a lower wall of the secondary battery; and a side surface tape portion connected to the upper surface tape portion and the lower surface tape portion and attached to a sidewall disposed between an upper wall of the secondary battery and a lower wall of the secondary battery.

The light reflection unit may include an upper light reflecting portion disposed in an upper region of the secondary battery; and a lower light reflecting portion disposed in a lower region of the secondary battery.

The optical path compensation unit may include an optical path compensating lens portion for changing a focal length according to a thickness through which light passes.

The optical path compensation unit may include a first compensating portion disposed between the upper light reflecting portion and the vision unit; and a second compensating portion disposed between the lower light reflecting portion and the vision unit.

The secondary battery manufacturing system may further include a first light source unit disposed between the optical path compensation unit and the vision unit and emitting light toward the tape.

The tape inspection device may further include a second light source unit disposed to be spaced apart from the vision unit with the first light source unit interposed therebetween and emitting light from an opposite side of the first light source unit to the tape.

DETAILED DESCRIPTION OF EMBODIMENTS

In order to sufficiently understand the present invention, operational advantages of the present invention, and objects accomplished by embodiments of the present invention, the accompanying drawings illustrating the embodiments of the present invention and contents described in the accompanying drawings should be referred.

Hereinafter, embodiments of the present invention will be described in detail with reference to the accompanying drawings. However, in describing the present invention, a description of a well-known function or configuration will be omitted in order to make the gist of the present invention obvious.

Figure 1:
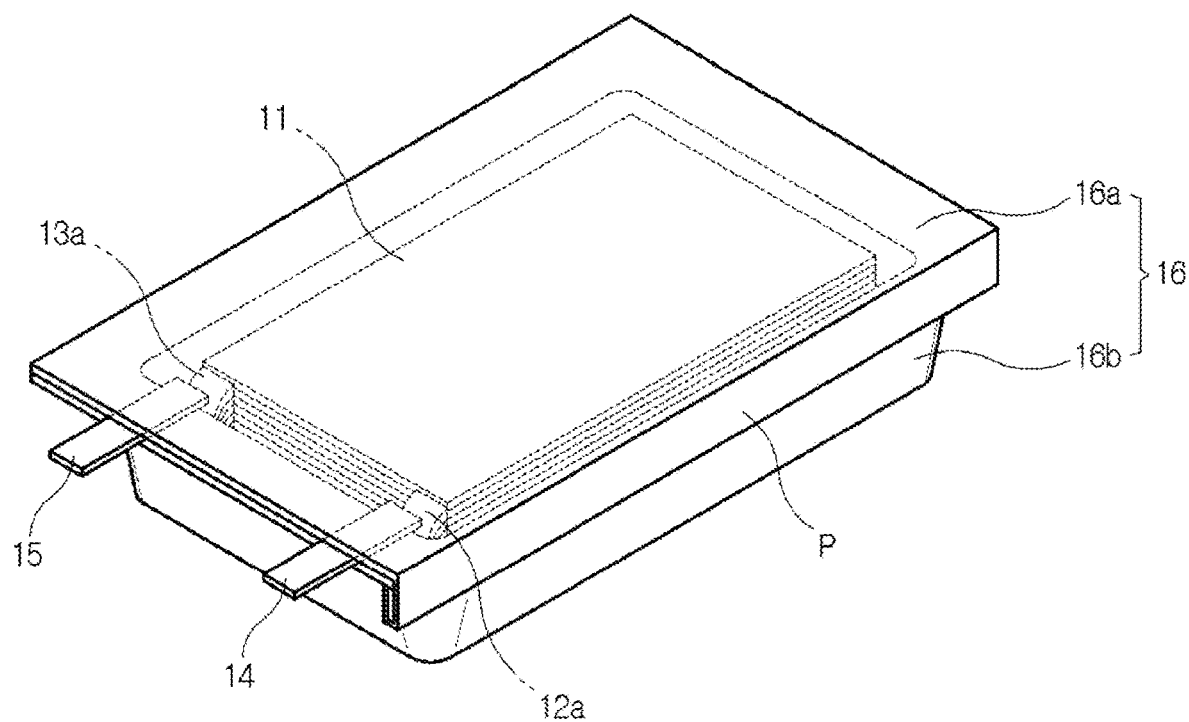
FIG. 1 is a view illustrating a pouch-type secondary battery.
Figure 2:
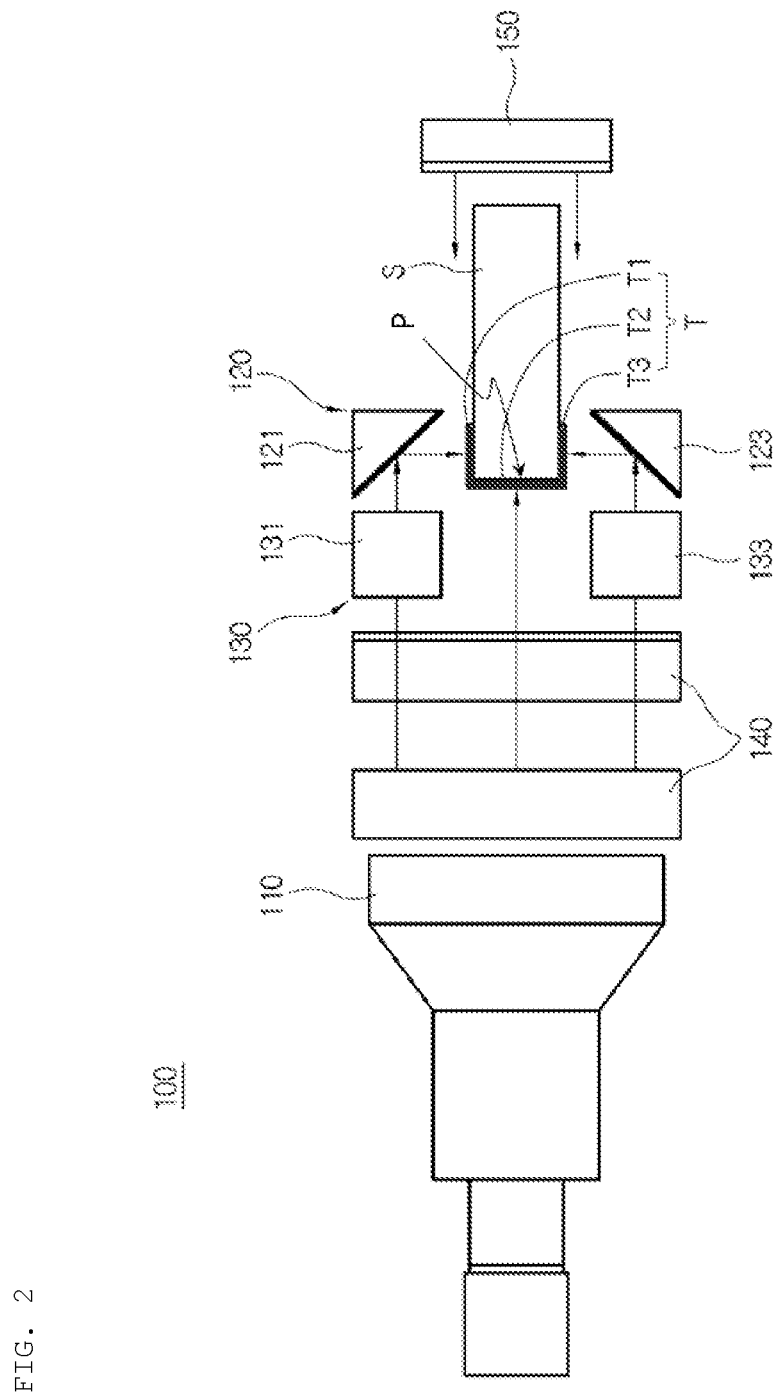
FIG. 2 is a view illustrating a tape inspection device according to an embodiment of the present invention.
Figure 3:
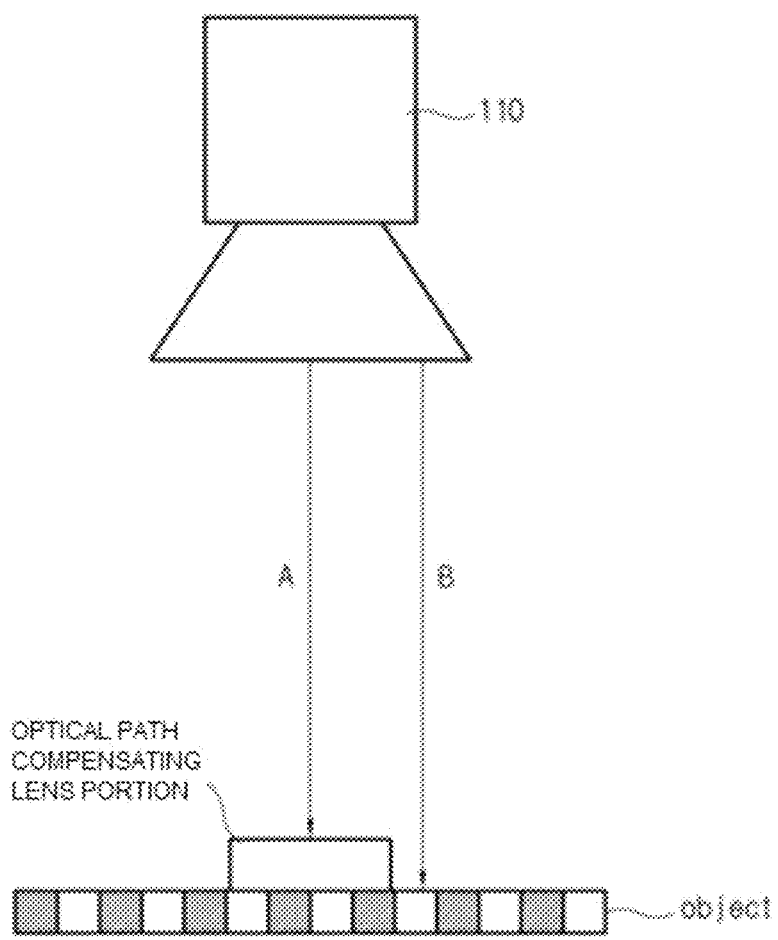
FIGS. 3 and 4 are views illustrating an effect of using an optical path compensation unit of FIG. 2.
Figure 4:
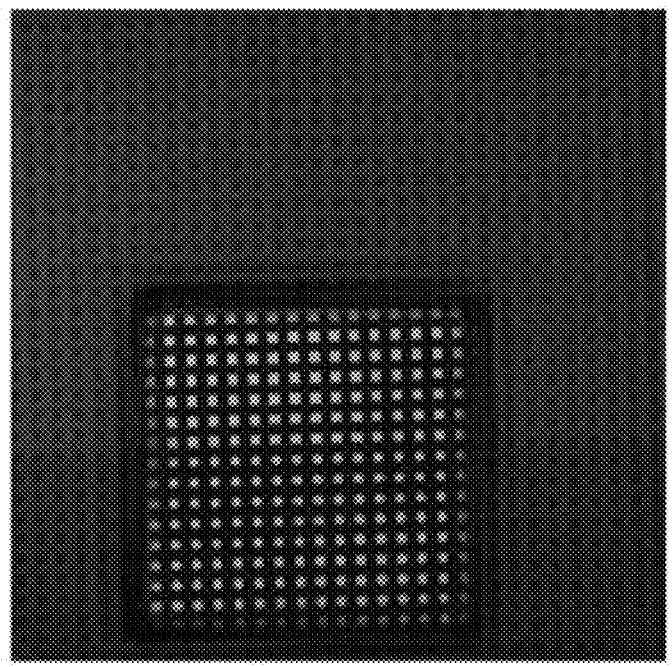
Figure 5:
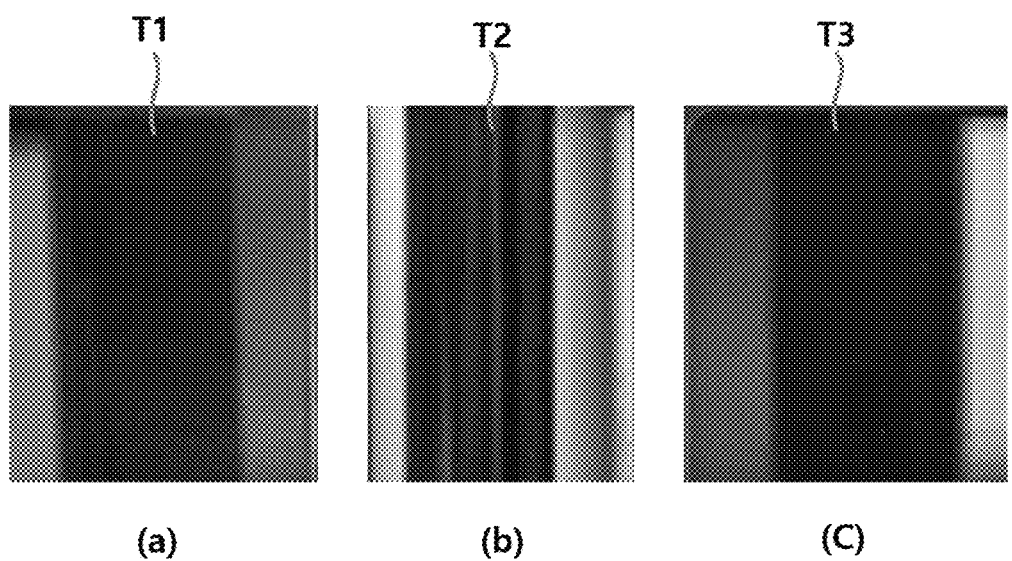
FIGS. 5(*a*)-(*c*) are views illustrating a screen in which a tape is imaged in a state in which the optical path compensation unit is not used in FIG. 2.
Figure 6:
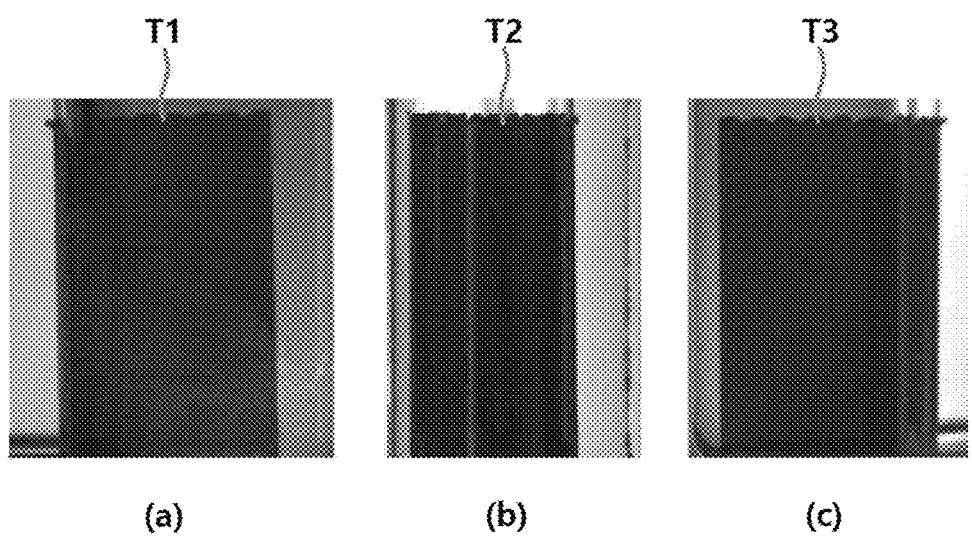
FIGS. 6(*a*)-(*c*) are views illustrating a screen in which a tape is imaged in a state in which the optical path compensation unit is used in FIG. 2.

FIG. 2 is a view illustrating a tape inspection device according to an embodiment of the present invention, FIGS. 3 and 4 are views illustrating an effect of using an optical path compensation unit of FIG. 2, FIG. 5 is a view illustrating a screen in which a tape is imaged in a state in which the optical path compensation unit is not used in FIG. 2, and FIG. 6 is a view illustrating a screen in which a tape is imaged in a state in which the optical path compensation unit is used in FIG. 2.

A secondary battery manufacturing system according to the present embodiment includes an electrode manufacturing device for manufacturing an electrode laminate (11), a sealing device for storing the electrode laminate (11) in a pouch-type battery case (16) having an upper sheet (16*a*) and a lower sheet (16*b*) and thermally sealing the upper sheet (16*a*) and the lower sheet (16*b*), a folding device for forming a folding portion (P) by folding flanges of both edges of the pouch-type battery case (16), a tape attachment device for attaching a tape (T) to an outer wall of a secondary battery (S) (that is, an outer wall of the pouch-type battery case) to fix the folding portion (P), and a tape inspection device (100) for inspecting an attachment state of the tape (T) attached to the secondary battery (S).

The pouch-type secondary battery (S) includes an electrode assembly (11), an electrode lead (14, 15), a pouch-type battery case (16), and a tape (T).

The electrode manufacturing device manufactures an electrode laminate (11). Although not illustrated in detail for the convenience of the drawing, the electrode laminate (11) is configured in a form in which one or more positive plates and one or more negative electrode plates are disposed with a separation membrane interposed therebetween, and is stored in the pouch-type battery case (16).

In this case, the electrode assembly (11) may be stored in the pouch-type battery case (16) in a state in which a plurality of positive plates and a plurality of negative plates are stacked, or stored in the pouch-type battery case (16) in a state in which one positive plate and one negative plate are wound. Here, the electrode laminate (11) may be a winding type, a stack type, or a stack/folding type electrode assembly.

The electrode plates of the electrode laminate (11) are formed in a structure in which an active material slurry is applied to a current collector made of an aluminum (Al) material or a copper (Cu) material, and the slurry may be formed by stirring in a state in which a solvent is usually added to a granular active material, auxiliary conductor, binder, and plasticizer. In addition, an uncoated portion to which the slurry is not applied may exist in each of the electrode plates, and an electrode tab corresponding to each of the electrode plates may be formed in the uncoated portion.

A chalcogenide compound may be used as a positive electrode active material to allow lithium ions to intercalate/deintercalate. The negative electrode active material may also be formed of a material such as carbon (C)-based material, silicon (Si), tin (Sn), tin oxide, tin alloy composite, transition metal oxide, lithium metal nitride, or lithium metal oxide to allow lithium ions to intercalate/deintercalate.

A separation membrane is interposed between the positive electrode plate and the negative electrode plate to block a short circuit that may occur between the positive electrode plate and the negative electrode plate, and only the movement of lithium ions is possible due to the separation membrane. The separation membrane may be formed of a thermoplastic resin such as polyethylene (PE) or polypropylene (PP), and a surface thereof may have a porous membrane structure.

The electrode tab includes a positive electrode tab (12*a*) and a negative electrode tab (13*a*), which are formed to protrude from the electrode laminate (11), respectively. That is, the positive electrode tab (12*a*) is formed to protrude from the positive electrode plate of the electrode laminate (11), and the negative electrode tab (13*a*) is formed to protrude from the negative electrode plate of the electrode laminate (11). In this case, the positive electrode tab (12*a*) or the negative electrode tab (13*a*) may be formed to protrude in the form of being attached to the positive electrode plate or the negative electrode plate, and may be made of the same material as the positive electrode current collector or the negative electrode current collector, respectively.

A plurality of electrode tabs (12*a*, 13*a*) may be provided in one electrode assembly. For example, a plurality of positive electrode tabs may be provided on the positive electrode plate, and a plurality of negative electrode tabs may be provided on the negative electrode plate. In this case, the plurality of positive electrode tabs may be connected to one positive electrode lead (14), and the plurality of negative electrode tabs may be connected to one negative electrode lead (15). However, the present invention is not necessarily limited to the embodiment described above, and one positive electrode tab and one negative electrode tab may be provided in one electrode laminate (11).

An electrode lead (14, 15) may be attached to an upper portion or a lower portion of the electrode tab. The materials of the positive electrode lead (14) and the negative electrode lead (15) may be different from each other. That is, the positive electrode lead (14) may be made of, for example, the aluminum material, in the same manner as the positive electrode plate, and the negative electrode lead (15) may be made of, for example, the copper material or nickel (Ni)-coated copper material as the negative electrode plate. The sealing device seals the pouch-type battery case (16) in a state in which the electrode laminate (11) is stored inside the pouch-type battery case (16).

Such a pouch-type battery case (16) has an internal space of a concave shape, the electrode laminate (11) is stored in such an inner space, and an electrolyte such as liquid, solid, or gel is filled in the inner space depending on the type of the pouch-type secondary battery S.

In the present embodiment, the pouch-type battery case (16) may be configured in the form of an aluminum pouch in which a metal layer (a thin film of aluminum) is interposed between an outer resin layer (insulating layer) and an inner resin layer (adhesive layer).

In order to protect the battery from the outside, since the insulating layer made of polymer needs to have excellent resistance from an external environment, it is required to have excellent tensile strength and weather resistance compared to a thickness thereof. For example, polyester-based resins such as polyethylene terephthalate (PET) and polyethylene naphthalate (PEN), polyolefin-based resins such as polyethylene and polypropylene, a polystyrene-based resin such as polystyrene, a polyvinyl chloride-based resin, a polyvinylidene chloride-based resin, or the like may be used. These materials may be used alone or in mixture of two or more materials, and polyethylene terephthalate, polyethylene naphthalate, or the like may be preferably used.

The aluminum thin film can serve as a substrate to maintain mechanical strength and a barrier layer to prevent penetration of moisture and oxygen. In order to exhibit a function of improving the strength of the battery case in addition to a function of preventing an inflow or leakage of foreign substances such as gas and moisture, aluminum or aluminum alloy may be used, and examples of the aluminum alloy include alloy numbers 8079, 1N30, 8021, 3003, 3004, 3005, 3104, 3105, and the like, and the aluminum alloys may be used alone or in combination of two or more aluminum alloys. Among them, the numbers 8079, 1N30, 8021, and 3004 may be particularly preferably used as the barrier layer.

The adhesive layer is also referred to as a thermal-sealing layer, and has heat-adhesive properties and may serve as a sealing agent. The adhesive layer may be formed of a polyolefin-based resin material. Casted polypropylene (CPP) is commonly used as a polyolefin-based resin layer. In addition, the adhesive layer may be formed of a material selected from the group consisting of chlorinated polypropylene, which is a polyolefin-based resin, polyethylene, ethylene propylene copolymer, polyethylene and acrylic acid copolymer, and polypropylene and acrylic acid copolymer, but is not limited to these materials.

A thickness of the pouch-type battery case (16) is usually 40 to 120 μm, a thickness of the insulating layer and the adhesive layer is preferably 10 to 40 μm, and a thickness of the aluminum thin film is preferably 20 to 100 μm, but are not limited thereto. If the thicknesses are too thin, it is not preferable because the barrier property between the outside and the inside of the pouch-type battery case (16) decreases and the strength is lowered, and conversely, if the thicknesses are too thick, not only processability is deteriorated, but also the thickness and weight of the pouch-type battery case (16) are increased.

The pouch-type battery case (16) according to the present embodiment includes an upper sheet (16*a*) and a lower sheet (16*b*). A storage space in which the electrode laminate (11) may be stored is formed in the lower sheet.

After the electrode laminate (11) is stored in the storage space of the lower sheet, the upper sheet and the lower sheet are covered to shield the electrode laminate (11). In this case, the upper sheet and the lower sheet are joined by thermal sealing or the like. The folding device forms a folding portion (P) by folding both edge regions of the pouch-type battery case (16). This folding portion (P) is bent by 90 degrees to contact a sidewall of the secondary battery (S) (i.e., a sidewall of the pouch-type battery case).

The tape attachment device attaches the tape (T) to an outer wall of the secondary battery (S) (i.e., an outer wall of the pouch-type battery case) in order to fix the folding portion (P). The tape attachment device according to the present embodiment includes a pressure roller portion for attaching the tape (T) the secondary battery (S) by pressing an outer surface of the tape (T) wound in the form of a roll to the secondary battery (S), and a cutting portion for cutting the tape.

The tape (T) attached to the outer wall of the secondary battery (S) by such a tape attachment device includes an upper surface tape portion T1 attached to an upper wall of the secondary battery S, a lower surface tape portion T3 attached to a lower wall of the secondary battery S, and a side surface tape portion T2 connected to the upper surface tape portion T1 and the lower surface tape portion T3 and attached to a sidewall disposed between the upper wall of the secondary battery (S) and the lower wall of the secondary battery (S), as illustrated in FIG. 2. Here, the side tape is connected to the folding portion (P) to fix the folding portion (P) so that the folding portion (P) is not unfolded.

The tape inspection device (100) inspects an attachment state of the tape (T). As illustrated in FIG. 2, the tape inspection device (100) includes a vision unit (110) for acquiring imaging information by imaging the tape (T) attached to the outer wall of the secondary battery (S) in order to fix the folding portion (P) of the secondary battery S, a light reflection unit (120) disposed to be spaced apart from the secondary battery (S) and reflecting light, an optical path compensation unit (130) disposed between the vision unit (110) and the light reflection unit (120) and compensating for an optical path between the tape (T) and the vision unit (110), a first light source unit (140) disposed between the optical path compensation unit (130) and the vision unit (110) and emitting light toward the tape (T), and a second light source unit (150) disposed to be spaced apart from the vision unit (110) with the first light source unit (140) interposed therebetween and emitting light from an opposite side of the first light source unit (140) to the tape (T).

The vision unit (110) acquires imaging information by imaging the tape (T) attached to the outer wall of the secondary battery (S) in order to fix the folding portion (P) of the secondary battery (S). Such a vision unit (110) includes a single camera imaging all of the upper surface tape portion (T1), the lower surface tape portion (T3), and the side surface tape portion (T2) at the same time.

The light reflection unit (120) is disposed to be spaced apart from the secondary battery (S). A reflective surface for reflecting light is formed on the light reflection unit (120).

As illustrated in FIG. 2, the light reflection unit (120) according to the present embodiment includes an upper light reflecting portion (121) disposed in an upper region of the secondary battery (S), and a lower light reflecting portion (123) disposed in a lower region of the secondary battery (S). The upper light reflecting portion (121) is used for imaging the upper surface tape portion (T1), and the lower light reflecting portion (123) is used for imaging the lower surface tape portion (T3). The optical path compensation unit (130) is disposed between the vision unit (110) and the light reflection unit (120). Such an optical path compensation unit (130) compensates for optical paths between the upper surface tape portion (T1) and the vision unit (110) and between the lower surface tape portion (T3) and the vision unit (110).

The optical path compensation unit (130) includes an optical path compensating lens portion for changing a focal length according to a thickness through which light passes.

This optical path compensating lens portion enables a distant object to be imaged to be recognized as being nearby, and an optical path with the object to be imaged is adjusted according to a thickness of the optical path compensating lens portion. When the object to be imaged is far away, the thickness of the optical path compensating lens portion becomes thick, and when the object to be imaged is near, the thickness of the optical path compensating lens portion becomes thin.

A distance $(L)=(1-1/n)*t$ (where n is a refractive index of the optical path compensating lens portion and t is a thickness of the optical path compensating lens portion) in which the optical path is reduced by the optical path compensating lens portion is obtained.

FIGS. 3 and 4 are views illustrating that the optical path compensation unit (130) of the present embodiment compensates for the optical path.

In FIG. 3, the vision unit (110) focuses on an upper surface portion of the optical path compensating lens portion. As illustrated in FIG. 4, in a picture obtained by imaging the object to be imaged in such a state, when the optical path is reduced by the optical path compensating lens portion (A), the focus is correct and a clear shape is displayed, but when the optical path compensating lens portion is not used (B), a blurry shape is displayed because the focus is not correct.

As illustrated in FIG. 2, the optical path compensation unit (130) according to the present embodiment includes a first compensating portion (131) disposed between the upper light reflecting portion (121) and the vision unit (110), and a second compensating portion (133) disposed between the lower light reflecting portion (123) and the vision unit (110).

The first compensation unit (131) is disposed between the upper light reflecting portion (121) and the vision unit (110) to shorten the optical path between the upper surface tape unit (T1) and the vision unit (110), thereby making the optical path between the upper surface tape portion (T1) and the vision unit (110) substantially the same as the optical path between the side surface tape portion (T2) and the vision unit (110). As a result, even if the vision unit (110) focuses on the side surface tape portion (T2), the upper surface tape portion (T1) may be clearly imaged.

In addition, the second compensation unit (133) is disposed between the lower light reflecting portion (123) and the vision unit (110) to shorten the optical path between the lower surface tape unit (T3) and the vision unit (110), thereby making the optical path between the lower surface tape portion (T3) and the vision unit (110) substantially the same as the optical path between the side surface tape portion (T2) and the vision unit (110). As a result, even if the vision unit (110) focuses on the side surface tape portion (T2), the lower surface tape portion (T3) may be clearly imaged.

Therefore, when the upper surface tape portion (T1), the side surface tape portion (T2), and the lower surface tape portion (T3) are imaged in the state in which the vision unit (110 focuses on the side surface tape portion (T2) without using the first compensating portion (131) and the second compensating portion (133) of the present embodiment, the side surface tape portion (T2) may be clearly displayed as illustrated in FIG. 5B, but the upper surface tape portion (T1) illustrated in FIG. 5A and the lower surface tape portion (T3) illustrated in FIG. 5C are dimly displayed.

Unlike this, when the upper surface tape portion (T1), the side surface tape portion (T2), and the lower surface tape portion (T3) are imaged in the state in which the vision unit (110) focuses on the side surface tape portion (T2) while using the first compensating portion (131) and the second compensating portion (133) of the present embodiment, the side surface tape portion (T2) illustrated in FIG. 6B as well as the upper surface tape portion (T1) illustrated in FIG. 6A and the lower surface tape portion (T3) illustrated in FIG. 6C are clearly displayed.

The first light source unit (140) is disposed between the optical path compensation unit (130) and the vision unit (110). The first light source unit (140) emits light toward the tape (T). In the present embodiment, a plurality of first light source units (140) are provided to be spaced apart from each other.

The second light source unit (150) is disposed to be spaced apart from the vision unit (110) with the first light source unit (140) interposed therebetween. The second light source unit (150) emits light from an opposite side of the first light source unit (140) to the tape (T), thereby preventing distal ends of the upper surface tape portion (T1) and the lower surface tape portion (T3) from being darkly imaged.

In this case, the vision unit (110) focuses on the side surface tape portion (T2). As described above, since the optical path between the upper surface tape portion (T1) and the vision unit (110) and the optical path between the lower surface tape portion (T3) and the vision unit (110) are almost the same as the optical path between the side surface tape portion (T2) and the vision unit (110) by the first compensating portion (131) and the second compensating portion (133), the upper surface tape portion (T1), the side surface tape portion (T2), and the lower surface tape portion (T3) may be clearly imaged with a single vision unit (110).

As described above, the tape inspection device (100) according to the present embodiment includes the vision unit (110) for acquiring the imaging information by imaging the tape (T) attached to the outer wall of the secondary battery (S) in order to fix the folding portion (P) of the secondary battery (S), and the optical path compensation unit (130) for compensating for the optical path between the tape (T) and the vision unit (110) to compensate for the optical path of the upper surface tape portion (T1) and the lower surface tape portion (T3), thereby making it possible to acquire the clear imaging screens of the upper surface tape portion (T1) and the lower surface tape portion (T3) with the single vision unit (110).

According to the embodiments of the present invention, the vision unit that acquires the imaging information by imaging the tape attached to the outer wall of the secondary battery in order to fix the folding portion of the secondary battery, and the optical path compensation unit that compensates the optical path between the tape and the vision unit may be provided to compensate for the optical path of the tape attached to the several portions, thereby making it possible to acquire the clear imaging screen of the tape attached to the several portions with the single vision unit.

Hereinabove, although the present embodiment has been described in detail with reference to the drawings, the scope of the present embodiment is not limited to the drawings and description described above.

As described above, the present invention is not limited to the described embodiments, and it will be apparent to those skilled in the art that various modifications and variations may be made without departing from the spirit and scope of the invention. Therefore, such modifications or variations belong to the claims of the present invention.

DETAILED DESCRIPTION OF MAIN ELEMENTS

110: vision unit
120: light reflection unit
121: upper light reflecting portion 123: lower light reflecting portion
130: optical path compensation unit
131: first compensating portion 133: second compensating portion
140: first light source unit 150: second light source unit
S: secondary battery
T: tape T1: upper surface tape portion
T2: side surface tape portion T3: lower surface tape portion

What is claimed is:

1. A tape inspection device comprising:
a vision component for acquiring imaging information by imaging a tape attached to an outer wall of a secondary battery in order to fix a folding portion of the secondary battery;
light sources emitting light toward the tape;
a light reflector disposed to be spaced apart from the secondary battery and reflecting light; and
an optical path compensation component disposed between the vision component and the light reflector and compensating for an optical path between the tape and the vision component,
wherein the vision component, the light sources, and the secondary battery are arranged in a straight line,
and the vision component images various surfaces of the secondary battery through the light reflector.

2. The tape inspection device of claim 1, wherein the tape includes:
an upper surface tape portion attached to an upper wall of the secondary battery;
a lower surface tape portion attached to a lower wall of the secondary battery; and
a side surface tape portion connected to the upper surface tape portion and the lower surface tape portion and attached to a sidewall disposed between an upper wall of the secondary battery and a lower wall of the secondary battery.

3. The tape inspection device of claim 2, wherein the vision component includes a single camera imaging all of the upper surface tape portion, the lower surface tape portion, and the side surface tape portion at the same time.

4. The tape inspection device of claim 2, wherein the light reflector includes:
an upper light reflecting portion disposed in an upper region of the secondary battery; and
a lower light reflecting portion disposed in a lower region of the secondary battery.

5. The tape inspection device of claim 4, wherein the optical path compensation component includes an optical path compensating lens portion for changing a focal length according to a thickness through which light passes.

6. The tape inspection device of claim 4, wherein the optical path compensation component includes:
a first compensating portion disposed between the upper light reflecting portion and the vision component; and
a second compensating portion disposed between the lower light reflecting portion and the vision component.

7. The tape inspection device of claim 1, wherein the light sources include:
a first light source disposed between the optical path compensation component and the vision component and emitting light toward the tape.

8. The tape inspection device of claim 7, wherein the light sources include:
a second light source disposed to be spaced apart from the vision component with the first light source interposed therebetween and emitting light from an opposite side of the first light source to the tape.

9. A secondary battery manufacturing system comprising:
a tape attachment device for attaching a tape (T) an outer wall of a secondary battery in order to fix a folding portion formed in the secondary battery;
a vision component for acquiring imaging information by imaging the tape attached to the outer wall of the secondary battery;
light sources emitting light toward the tape;
a light reflector disposed to be spaced apart from the secondary battery and reflecting light; and
an optical path compensation unit component disposed between the vision component and the light reflector and compensating for an optical path between the tape and the vision component, wherein the vision component, the light sources, and the secondary battery are arranged in a straight line, and the vision component images various surfaces of the secondary battery through the light reflector.

10. The secondary battery manufacturing system of claim 9, wherein the tape includes:
    an upper surface tape portion attached to an upper wall of the secondary battery;
    a lower surface tape portion attached to a lower wall of the secondary battery; and
    a side surface tape portion connected to the upper surface tape portion and the lower surface tape portion and attached to a sidewall disposed between an upper wall of the secondary battery and a lower wall of the secondary battery.

11. The tape inspection device of claim 10, wherein the vision component includes a single camera imaging all of the upper surface tape portion, the lower surface tape portion, and the side surface tape portion at the same time.

12. The secondary battery manufacturing system of claim 10, wherein the light reflector includes:
    an upper light reflecting portion disposed in an upper region of the secondary battery; and
    a lower light reflecting portion disposed in a lower region of the secondary battery.

13. The secondary battery manufacturing system of claim 10, wherein the optical path compensation component includes an optical path compensating lens portion for changing a focal length according to a thickness through which light passes.

14. The secondary battery manufacturing system of claim 10, wherein the optical path compensation component includes:
    a first compensating portion disposed between the upper light reflecting portion and the vision component; and
    a second compensating portion disposed between the lower light reflecting portion and the vision component.

15. The secondary battery manufacturing system of claim 9, wherein the light sources include:
    a first light source disposed between the optical path compensation component and the vision component and emitting light toward the tape.

16. The secondary battery manufacturing system of claim 15, wherein the light sources include:
    a second light source disposed to be spaced apart from the vision component with the first light source interposed therebetween and emitting light from an opposite side of the first light source to the tape.

* * * * *